July 7, 1964 J. H. DEVINE ETAL 3,139,675
TOOL FOR LOCKING, UNLOCKING AND EXTRACTING
AN EXPANDABLE BLIND BOLT
Filed July 20, 1960 5 Sheets-Sheet 3
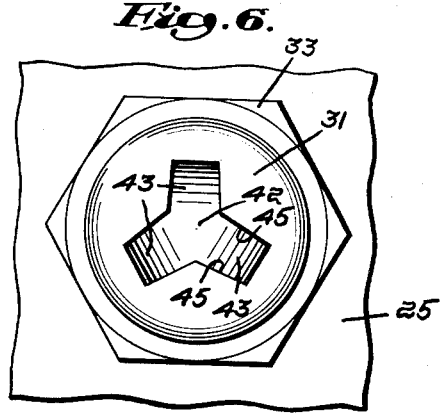
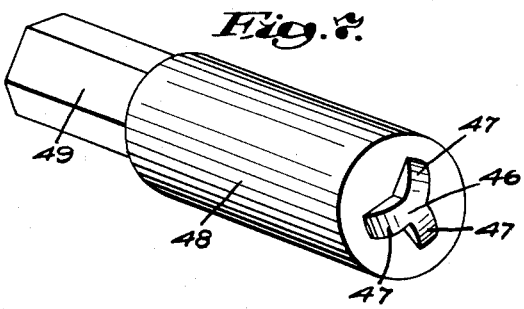
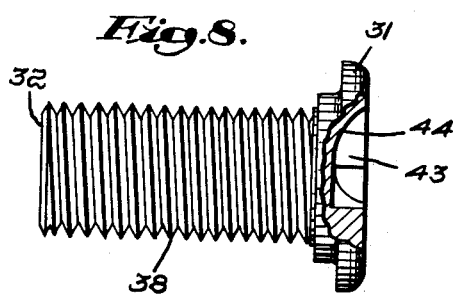
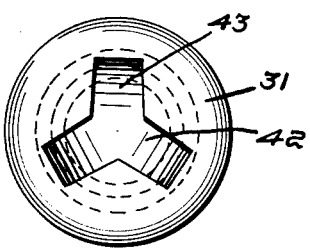
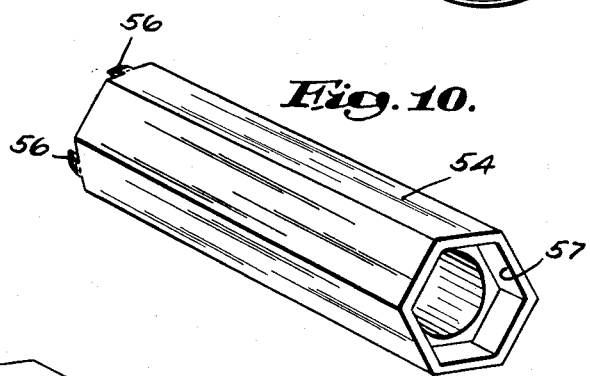
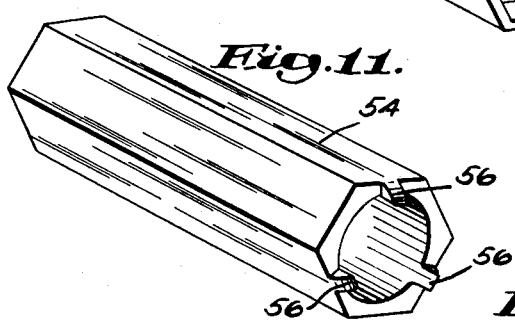
Inventors:
James Henry Devine,
Evelyn Yurcessen Devine,
by Robert D. Thomson Attorney

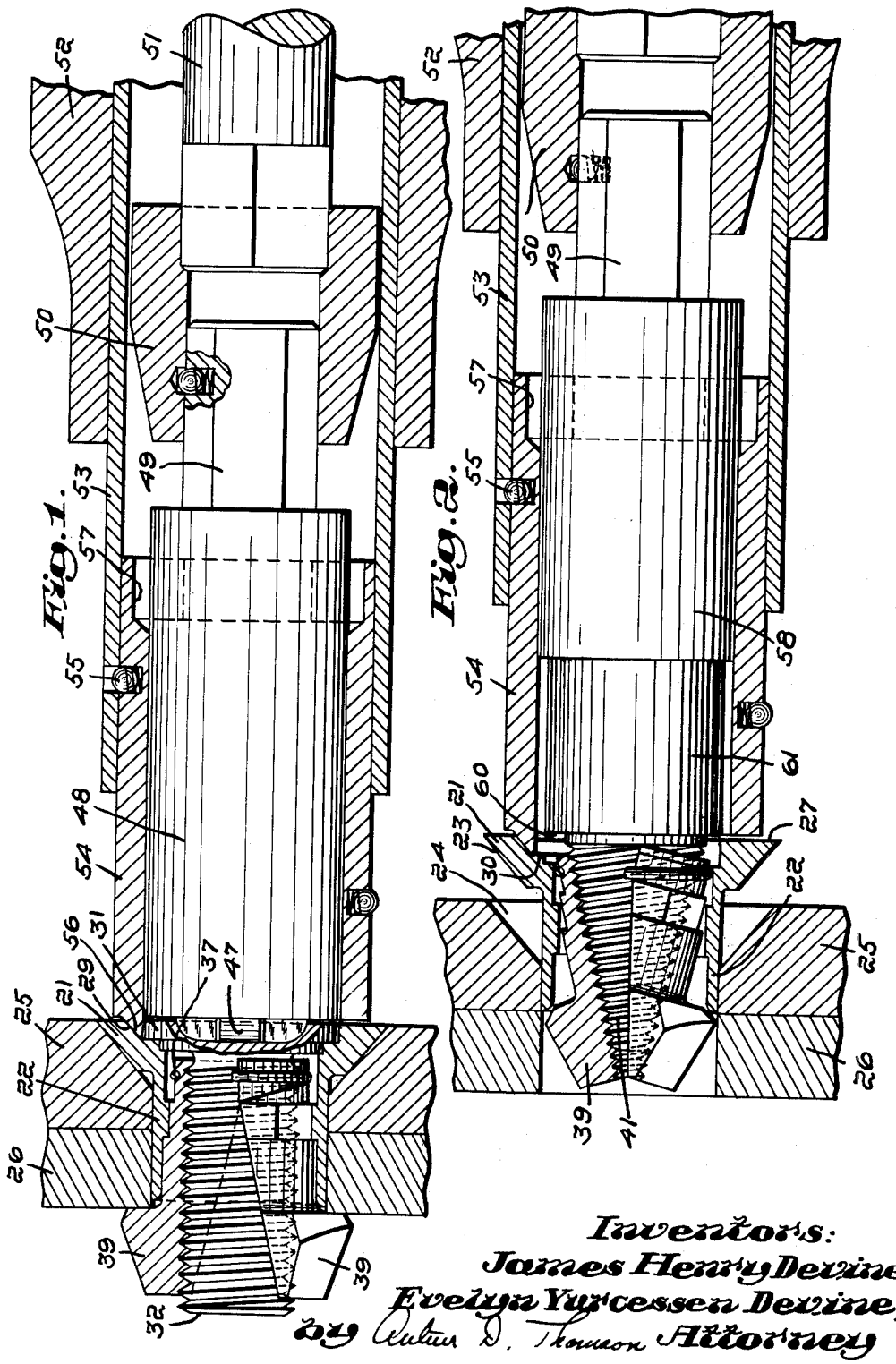

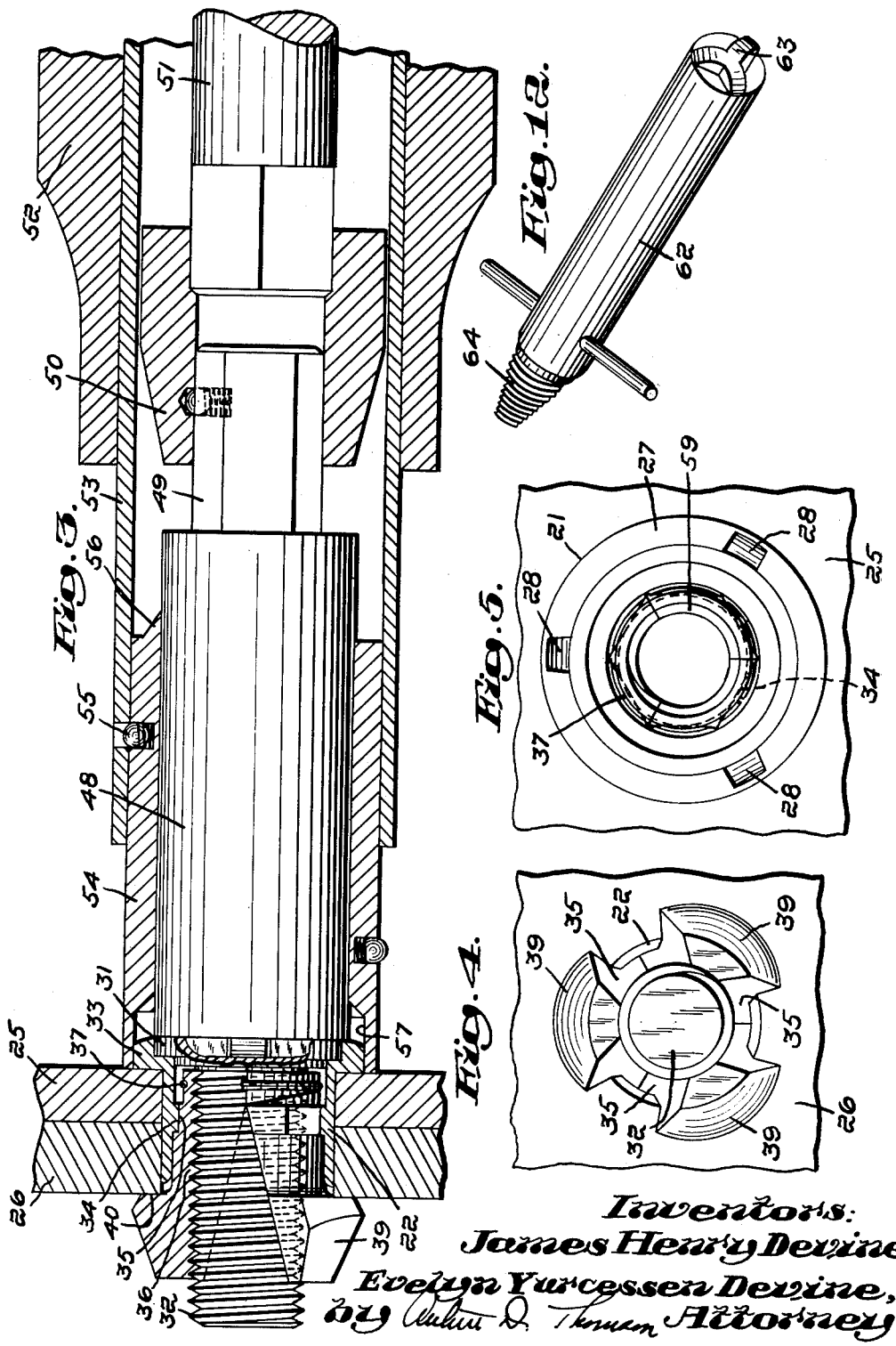

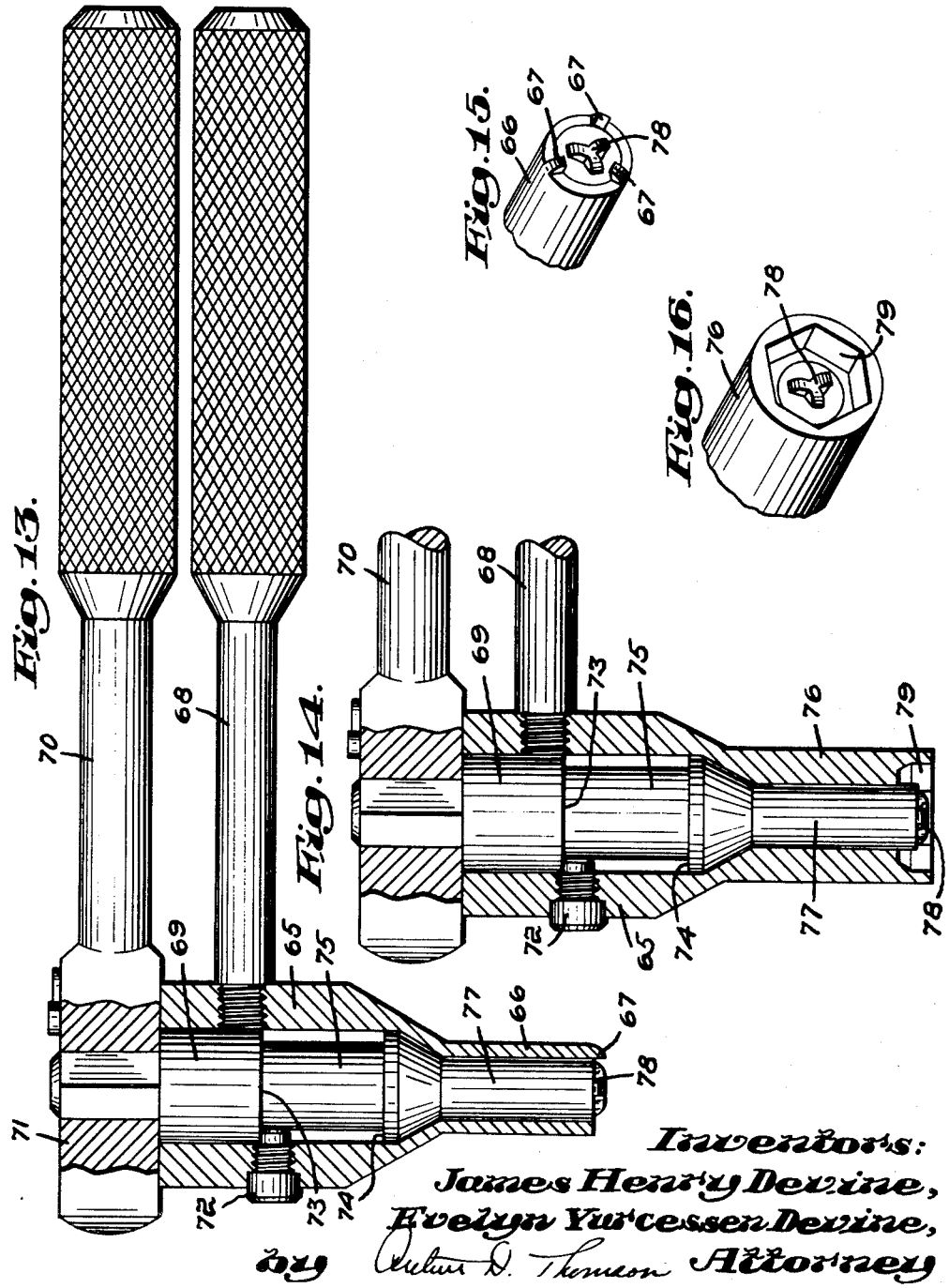

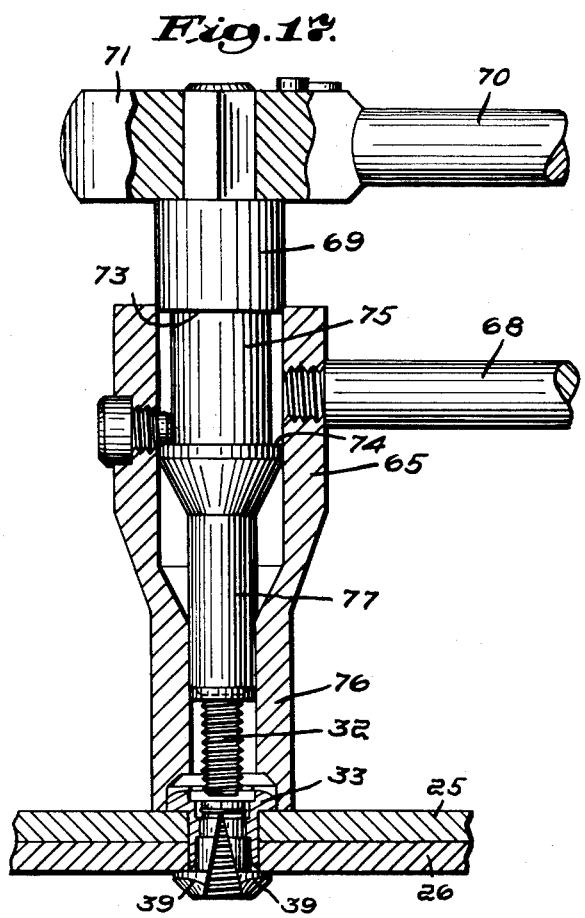

United States Patent Office 3,139,675
Patented July 7, 1964

3,139,675
TOOL FOR LOCKING, UNLOCKING AND EXTRACTING AN EXPANDABLE BLIND BOLT
James Henry Devine, Brookline, Mass., and Evelyn Yurcessen Devine, 380 Washington St., Brookline, Mass.; said James Henry Devine assignor to D-Y Trust, Boston, Mass., a trust of Massachusetts
Filed July 20, 1960, Ser. No. 44,224
1 Claim. (Cl. 29—240)

This invention relates to improvements in tools for locking, unlocking and extracting an expandable blind bolt, particularly a bolt with self-contained, multi-part nut and centering sleeve as disclosed in our copending application Serial No. 835,580, filed August 24, 1959, now Patent No. 3,096,678, describing a blind bolt in which a three-part expandable nut is keyed against relative rotation within centering sleeve having a head shaped to be engaged by a holding tool while a removable center component provided with a head having a torque recess of unique formation is tightened or loosened by a tool fitting said recess.

Two alternative forms of such bolts are shown in said application: a flush type, in which the head of the centering sleeve is flush with the surface of a plate to be bolted to an underlying, inaccessible plate, the head having three notches adapted to receive a three-pronged spanner wrench, to hold the sleeve stationary; and a protruding type, in which the head of said sleeve has an outwardly projecting annular flange of hex-shaped form adapted to be engaged by a standard or socket wrench, to hold the sleeve stationary.

In each form of the bolt, the center component which engages and expands the nut parts or segments, to lock two or more plates or panels together, has a threaded stem engaging complemental threads of the radially rockable nut segments, and a head portion fitting a cavity of the flush type sleeve or bearing on the flanged head of the protruding type sleeve; and the head of the center component is recessed to provide three radially extending sockets adapted to receive a three-bladed driver of a suitable torquing tool. Thus, the center component may be torqued to lock the bolt, or loosened and removed to free the locking nut segments thereof, while the centering sleeve is held stationary as aforesaid.

After the center component is removed, the nut segments of the bolt may be contracted so that their locking heads may be withdrawn through the concentric openings previously bored in the plates or panels to be bolted together. When the innermost plate is inaccessible, the nut segments must be contracted by a special tool; for the segments are yieldingly held in partially expanded position by an encircling spring disposed adjacent the pivot plane of the segments. A hand tool having a threaded, conical portion designed for that purpose is disclosed but not claimed in our aforesaid copending application.

It is accordingly the principal purpose of the present invention to provide a hand-operated or power-operated tool having a portion shaped to fit the unique torque recess of the said center component, and preferably equipped with parts or portions for holding the centering sleeve as aforesaid, and a part or portion for extracting the nut component assembly after the center component has been removed.

More specifically, it is an object of this invention to provide a tool having a specially shaped driver so fitting the unique shape of the said torque recess that the interfitted elements tend to frictionally interlock with a jam-mining action and thus restrain slipping or separation while the driver is operated to tighten or loosen the center component of the bolt.

The accompanying drawings illustrate the two forms of the blind bolt described in the aforesaid pending application, and recommended embodiments of the improved tools for locking, unlocking and extracting the bolt, all such operations being performed at the readily accessible side of the plates or other structures which are to be bolted together, or unbolted.

In said drawings:

FIG. 1 is a central longitudinal section, partly in elevation and with portions broken away, showing a power tool associated with our blind bolt of the flush type, in position for final tightening or initial loosening of the center component;

FIG. 2 is a view similar to FIG. 1, showing the power tool equipped with an extractor which has contracted the nut segments of the bolt and is withdrawing the nut component assembly, including the centering sleeve;

FIG. 3 is a view similar to FIG. 1, but showing a bolt of the protruding type;

FIG. 4 is an elevation looking to the right of FIG. 1 or FIG. 3, showing the inner end of the expanded nut assembly and the end of the center component;

FIG. 5 is a plan view of the flush type bolt head of FIG. 1, the center component has been removed, the tool being omitted;

FIG. 6 is a similar plan view of the protuding type bolt head, with the center component in place, showing the hex-shaped flange of the centering sleeve, and the torque recess in the head of the center component;

FIG. 7 is a perspective view, to reduced scale, of the driver of the power tool shown in FIG. 1 and FIG. 3;

FIG. 8 is an elevation of the removed center component, with portions of its recessed head broken away;

FIG. 9 is a plan view of the head position of the center component;

FIG. 10 is a perspective view, to reduced scale, of a holding sleeve forming part of the power tool of FIGS. 1 to 3;

FIG. 11 is a view similar to FIG. 10, showing the opposite end of the holding sleeve;

FIG. 12 is a perspective view of an optional hand tool having a driver for the said torque recess at one end, and a threaded conical extractor at its opposite end;

FIG. 13 is an elevation, partly in section, showing a modified tool of the ratchet type, equipped with a driver for the torque recess and with holding elements for the flush type centering sleeve;

FIG. 14 is a view similar to FIG. 13 in which the tool is provided with holding elements for the protruding type centering sleeve;

FIG. 15 is a fragmentary perspective of the operative end of the tool of FIG. 13;

FIG. 16 is a similar view of the operative end of the tool of FIG. 14; and

FIG. 17 is a view similar to FIG. 14, showing the center component unthreaded from the nut assembly and withdrawn into the nose portion of the tool.

The expandable blind bolt forms, as shown in FIGS. 1 to 6, are substantially identical to the flush type and protruding type forms disclosed in our said copending application, Serial No. 835,580 (3,096,678); and the hand tool of FIG. 12 corresponds to the tool illustrated in FIG. 22, of that application. Except for the shape and disposition with respect to the outermost panel of the bolted plates, of the head portions of the respective centering sleeves (the flush and protruding types), both optional forms of the bolt are the same, including the center component and its recessed head. Thus, the tools herein described have a common form of driver for the torque recess of the center component, but have alternate forms of holding means to engage and hold stationary the flush and protruding heads, respectively of the centering sleeve of the bolt.

The flush type head 21 of the centering sleeve 22 (FIGS. 1 and 2) has a conical under surface 23 receivable in a counterbored opening 24 in the outer plate 25 which is bolted to the inner plate 26, in FIG. 1. The rim surface 27 of sleeve head 21 is formed with three, equally spaced, radial notches 28, preferably having inclined outer walls, as best shown in FIG. 5 and at 29 in FIG. 1. Those notches receive the prongs of a holding tool as hereinafter described. The sleeve head is recessed within the rim 27 and formed with one or more annular shoulders 30 (FIG. 2) adapted to be engaged by the head portion 31 of the center component 32.

The protruding type sleeve head 33 (FIGS. 3 and 6) is flanged to seat upon the surface of the outer plate 25, and is preferably hex-shaped, as best shown in FIG. 6, and adapted to be engaged by the complemental socket of an alternate holding tool described below. Sleeve head 33 may be recessed to receive the head 31 of the center component, as shown in FIG. 3, so that the latter is substantially flush with the hex-shaped rim 33, when the center component is in locking position, as shown.

The centering sleeve of the bolt, in each form, surrounds and retains the nut segments of the expandable bolt, and is keyed thereto to prevent relative rotation between those parts of the nut assembly. This is preferably accomplished by forming an interior hex-shaped shoulder 34 on the inner wall of the sleeve, and forming complemental surfaces 35 in the outer surfaces of the nut segments 36 centered within the sleeve, whereby the nut segments may slide longitudinally of the sleeve for a limited distance but may not rotate relative to the sleeve. Relative inward longitudinal movement of the segments is limited by a C-ring 37 which partially seats in grooves in the respective nut segments in order yieldingly to hold the three segments in cooperative relationship, and which projects sufficiently to engage th hex-shaped shoulder 34 of the sleeve.

The axially rockable nut segments 36 are internally threaded to be engaged by the threaded stem 38 of the center component 32 when the latter is screwed into the nut assembly to tighten the bolt. Each similar nut segment has a flanged head portion 39 formed with an outwardly extending flat surface 40 adapted to bear against the surface of the inner plate 26 which is thus secured to plate 25, when the threaded center component is fully tightened to expand the nut segments and lock the blind bolt in place.

As more fully described in our said copending application, the respective nut segments have edge bearing surfaces which permit them to rock relative to each other from the expanded or locking position of FIGS. 1 or 3 to the contracted or unlocked position of FIG. 2, within the centering sleeve 22 which, with the spring-encircled segments provides a unitary nut assembly. In the contracted positon of the segments, the assembly may readily be inserted into the concentric openings of the plates 25 and 26 until the nut heads 39 clear the innermost surface, when they normally expand under the action of the C-ring 37 which is disposed adjacent the pivotal plane of the segments and near the outer ends thereof.

Hence, when the nut heads are not accessible for manual contraction, special means must be provided to contract the nut segments in order to extract the bolt from the openings in the plates. The threaded conical tool part 41 serves to contract the inner nut heads by expanding the outer ends of the nut segments, and also threads into the contracted segments so that the nut assembly may be extracted as a unit, as illustrated in FIG. 2.

Before such extraction, however, the center component 32 must be unscrewed and removed. For that purpose, as well as to torque up that component to lock the bolt, the head portion 31 of the component is formed with a special torque recess, and a complementary tool part is provided to engage and hold in that recess. The torque recess 42 has three channels 43 (FIG. 6) radiating from a central cavity at equal angles. The wide bottom surface 44 of each channel slopes downwardly and inwardly from the flat surface of the head portion 31, and is preferably concaved, as shown in FIG. 8. The opposite side walls 45 of each channel are flat and disposed substantially perpendicular to the flat top of the head of the center component, but are disposed, respectively, in planes inclined toward each other in an outward direction toward the periphery of the head portion 31, preferably at an included angle of about 14°. Thus, when a tool has a driver end formed with projections complemental to the shape of the channeled recess 42, the driver will engage tightly in the recess or socket with a jamming action, and will be frictionally retained therein, so that it will not slip or release under high torque, as the center component is being driven to its ultimate locking seat in the nut assembly of the bolt.

Such a driver is shown in FIGS. 1, 3 and 7, in a power operated tool, the driver head 46 having three radial blades 47 each of tapered, convex form to fit closely in the inclined, concave channels 43 of the torque recess 42, and to bear against all surfaces thereof in precise interlocking engagement. The driver head is formed on a tool part 48 of cylindrical shape, the opposite end of the cylindrical body having a hex-shaped projection 49 to fit the hex socket or chuck 50 of a driven shaft 51 of a known form of power tool 52 equipped with a stationary barrel 53 having a hex-shaped interior wall.

A sleeve part 54 of complemental hex shape (FIG. 10 or 11) fits slidably but non-rotatably within the barrel 53 where it is releasibly retained in operative position by a spring-pressed ball 55, or equivalent means; the driver body 48 being rotatable within the stationary sleeve part 54 when the shaft 51 is power driven. Sleeve 54 is reversibly engageable in barrel 53, and has alternate forms of holding means at its opposite ends. One end is provided with three prongs 56 having convex outer surfaces to fit the three concaved notches 28 in the rim of the flush type centering sleeve head 21 (FIGS. 1 and 11). The other end of the holding sleeve 54 has a hex-shaped socket 57 to engage the hex head 33 of the protruding type of centering sleeve 32 (FIGS. 3 and 10).

Thus, the centering sleeve of the nut assembly, and the nut segments thereof, are held stationary while the driver of the power tool rotates the center component, either to tighten it or loosen it in the nut assembly of the bolt. In the same manner, the centering sleeve is held stationary when the power tool is equipped with a driven member 58 having the threaded conical extractor 41, to engage and contract the nut segments and withdraw the nut assembly (FIG. 2), as previously explained.

It will be understood that, when the center component is unscrewed and withdrawn from the nut assembly of the bolt, the tool part 48 is retracted within the holding sleeve 54 (to the right, as shown in FIGS. 1 and 3), while the driver blades 47 remain engaged in the torque recess 42 of the outwardly drawn center component, and while the tool barrel 53 and holding sleeve remain stationary to prevent rotation of the centering sleeve 22 (either flush or protruding). Similarly, tool part 48 would be retracted within holding sleeve 54 when the center component is to be threaded into the nut assembly of the bolt.

However, when the nut assembly is being extracted (FIG. 2), the tool part 58 is not rotated or retracted into holding sleeve 54, inasmuch as the centering sleeve 22 and nut segments 36 are withdrawn as a unit by the extractor 41. For that purpose the tool as a whole would be manually retracted, as shown in FIG. 2, Nevertheless, tool part 58 is slidably retractable within holding sleeve 54, so that the extractor 41 may be power screwed into the nut assembly of the bolt while the head of the centering sleeve is held stationary by the holding sleeve.

It will also be understood that when the inner or head portions 39 of the respective nut segments are expanded toward locking position by action of the C-ring 37, the opposite or outer ends 59 of the segments are contracted and in mutually edge-abutting relation, as shown in FIG. 5. Hence, when the tapered extractor 41 is threaded into the nut assembly, the said outer segment ends 59 are expanded, causing the inner or head portions 39 of the respective segments to swing inwardly on a pivot plane disposed inwardly of the C-ring 37, into contracted position (FIG. 2).

Inasmuch as continued inward threading of extractor 41 would tend to reexpand the head portions 39, it is desirable to limit the inward movement of the extractor. For that purpose, an annular stop shoulder 60 is preferably provided intermediate the tapered or conical extractor portion 41 and the stem portion 61 of tool part 58. Said shoulder 60 is adapted to engage the outer ends 59 of the nut segments, thereby limiting the extent to which the extractor 41 may be threaded into the nut assembly.

When a power tool of the type above described in un-unavailable or undesirable for a particular installation, the hand tool 62, shown in FIG. 12, having a three bladed driver 63 at one end and a threaded conical extractor 64 at the opposite end, may be used, selectively, to rotate the center component and to contract and withdraw the nut assembly and the centering sleeve (either type) of the bolt. In such case, a separate tool would be needed to hold the head of the centering sleeve against rotation; for example, a three-pronged spanner wrench for the flush type sleeve, or a standard wrench for the protruding type sleeve.

Other hand tools, designed for ratchet operation of the driver and adapted to screw the center component into or out of the nut assembly, while the centering sleeve is held stationary, are shown in the modifications of FIGS. 13 to 17. The tool in FIG. 13 is adapted for use with the flush type sleeve; whereas the tool shown in FIGS. 14 and 17 is designed for the protruding type sleeve. Except for the form of the sleeve-holding nose of the tool barrel, both tools are substantially identical in construction and operation.

In FIGS. 13 and 15, the tool barrel 65 has a reduced nose portion 66 provided with three spaced prongs 67 adapted to fit the corresponding notches 28 of the head of the centering sleeve (FIG. 5). Barrel 65 is held stationary by handle 68, while the driver shaft 69 is rotated by the ratchet handle 70, the ratchet end 71 being of known construction and operation when fitted to the squared end of the driver shaft, as shown.

The driver shaft or body portion 69 is movable longitudinally in the barrel 65, the extent of such movement preferably being limited by a stop screw 72 adapted to engage spaced annular shoulders 73 and 74, formed by reducing the diameter of the body at portion 75 (FIGS. 13, 14 and 17). The distance between shoulders 73 and 74 is sufficient to permit the center component 32 to be withdrawn into the nose portion 66 of the barrel of FIG. 13, or the nose portion 76 of the barrel of FIG. 14, as indicated in FIG. 17.

A reduced end portion 77 of the driver body slides and rotates with the said nose portion of the tool, and its extreme end is provided with a three bladed driver 78 adapted to fit the torque recess 42 in the head of the center component (FIG. 9), as previously explained.

In order to hold the protruding type sleeve against rotation, the nose 76 of the alternative barrel shown in FIGS. 14, 16 and 17 is formed with a hex-shaped socket 79 to fit over the similarly shaped flange 33 (FIG. 6) of the head of that centering sleeve, as heretofore described and as indicated in FIG. 17. That figure illustrates the position of the tool parts and their relation to the blind bolt when the center component 32 has been withdrawn from (or is about to be threaded into) the nut asembly of a bolt equipped with the protruding type sleeve. It will be understood that the relationship is similar when the centering sleeve is of the flush type described above.

It will also be apparent that the non-essential structural details of the tools herein disclosed for locking, unlocking and/or extracting an expandable blind bolt of the character described, may be further modified or varied for particular purposes, without departing from the essence of this invention as set forth in the following claim.

We claim.

A tool for contracting and extracting the expandable, internally-threaded nut segments of a bolt having a centering sleeve surrounding the nut segments and having a head portion shaped to be engaged by a holding member; said tool comprising a holding sleeve and a driven member disposed in said sleeve and rotatable therein; said driven member having a conical, threaded extractor at its outer ends, adapted for screw-threaded engagement with the internal threads of said expanded nut segments, whereby said segments are contracted; and said holding sleeve having an end member shaped to engage the head portion of said centering sleeve, so that the centering sleeve may be held stationary while the extractor of the driven member is being threaded into said nut segments.

References Cited in the file of this patent

UNITED STATES PATENTS

| | | |
|---|---|---|
| 1,227,391 | Cooper | May 22, 1917 |
| 1,424,235 | Bronander | Aug. 1, 1922 |
| 1,973,940 | Allen | Sept. 18, 1934 |
| 2,046,837 | Phillips | July 7, 1936 |
| 2,194,069 | Gagne | Mar. 19, 1940 |
| 2,525,117 | Campbell | Oct. 10, 1950 |
| 2,764,197 | Torresen | Sept. 25, 1956 |
| 2,789,597 | La Torre | Apr. 23, 1957 |
| 3,021,112 | Forman | Feb. 13, 1962 |